United States Patent [19]

Miller

[11] Patent Number: 4,501,005
[45] Date of Patent: Feb. 19, 1985

[54] VEHICLE ELAPSED MILEAGE INDICATOR
[75] Inventor: Albert J. Miller, Campbell, Calif.
[73] Assignee: Atlas Electronics International, Inc., Santa Clara, Calif.
[21] Appl. No.: 380,913
[22] Filed: May 21, 1982
[51] Int. Cl.[3] .................... G04F 13/04; G01R 23/10
[52] U.S. Cl. .................................. 377/20; 328/129.1; 368/5; 368/8; 340/52 D; 307/10 R
[58] Field of Search ............... 340/52 F, 52 D; 368/5, 368/6, 8, 9; 377/19, 20, 39, 47; 307/10 R

[56] References Cited
U.S. PATENT DOCUMENTS
4,031,363 6/1977 Freeman et al. ................. 340/52 F
4,284,972 8/1981 Chiu et al. ........................ 307/10 R
4,404,641 9/1983 Bazarnik ............................. 377/20

Primary Examiner—John S. Heyman
Attorney, Agent, or Firm—Harris Zimmerman; Howard Cohen

[57] ABSTRACT

A device for indicating required vehicle maintainence at predetermined elapsed mileage intervals includes a clock generator which is driven by the vehicle engine ignition pulse. The clock output is fed to a frequency divider, which in turn drives four counters. Each counter includes AND logic connected to selected outputs thereof to be switched on after a pre-determined count is obtained by the counter. The AND logic of each counter drives a flip-flop which actuates an LED warning lamp. Each counter circuit includes a reset button which resets the counter and its associated flip-flop. The LEDs may be labelled with a service function which should be performed after the time interval indicated by the respective LED.

6 Claims, 1 Drawing Figure

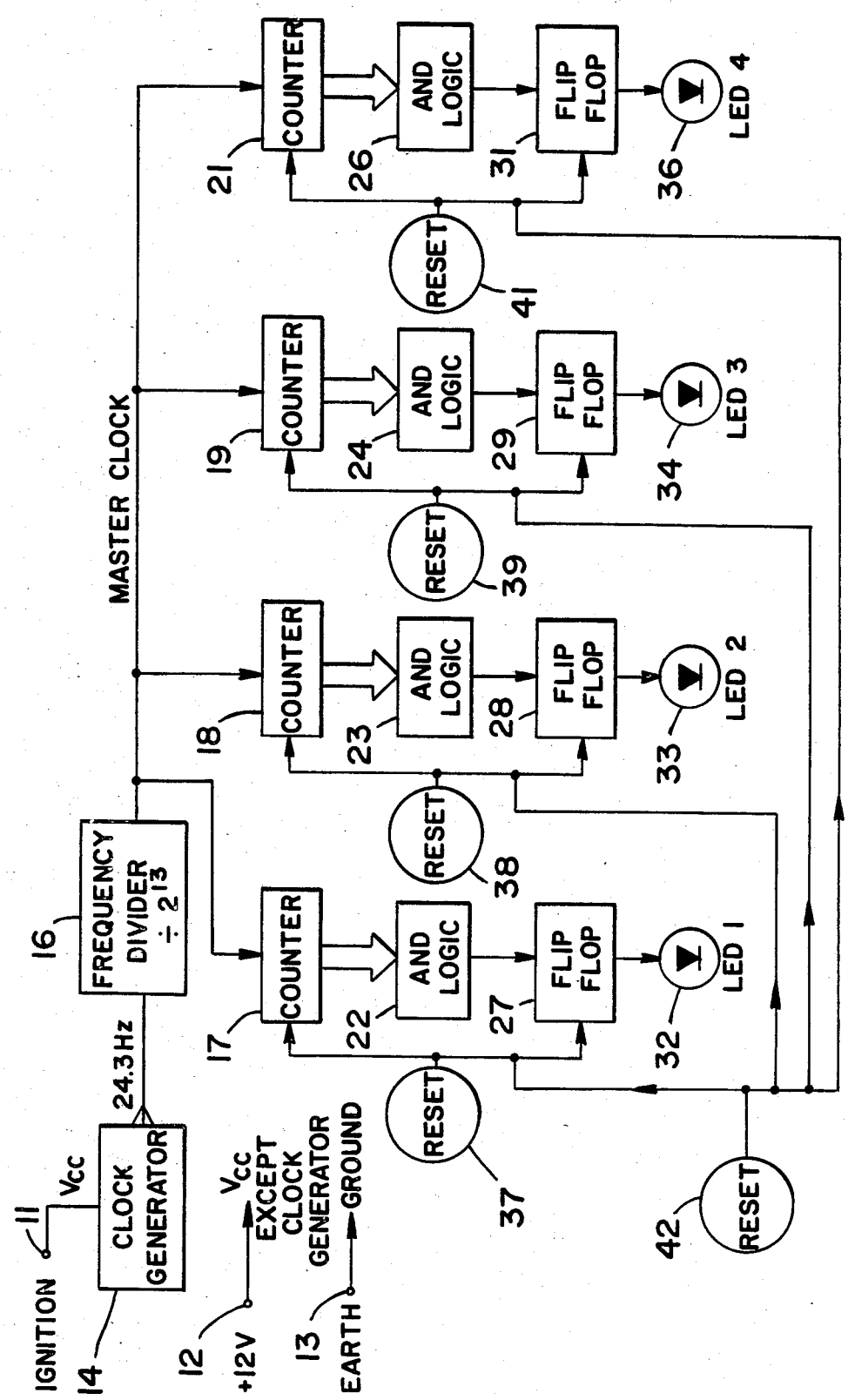

VEHICLE ELAPSED MILEAGE INDICATOR

BACKGROUND OF THE INVENTION

Over the past years, many articles have been written in daily newspapers and periodicals, particularly in magazines, relating to the automotive industry, about the need for proper maintenance of an automobile. In fact, most of the auto manufacturers' warranties require periodic servicing in order for the warranty to be effective.

The dramatic increase in the cost of automobiles and auto parts over the past five years has made this need for maintenance even more apparent. That is, an automobile which is poorly maintained may require a greater number of more expensive auto parts for repair. Coupled with this need is the fact that many things can be done by the driver or owner of an automobile to maintain the automobile. Vehicle service performed by the owner obviously reduces service costs, representing a significant savings for the owner. Moreover, a properly maintained vehicle uses fuel far more efficiently, resulting in lower fuel costs for the owner.

Moreover, proper maintenance of a vehicle can enhance the useful life of many of the operating components. For example, proper tire care can result in as much as a twenty-five percent longer useful life for the tires. Likewise, it is well known that timely oil changes and lubrications will lengthen and strengthen the useful life of the engine and suspension.

In years past when service stations were truly service stations, and not simply dispensers of gasoline, some help was given to the motorist by attendants affixing to the car a pressure-sensitive sticker which indicated the mileage of the vehicle at which the next standard servicing functions should be performed, such as oil change, filter change, lubrication, and the like. However, with the demise of the service station and the rise of the gas station, said stickers are no longer affixed to vehicles.

Unless one keeps a specific notebook to which one refers on a periodic basis, with it constantly being updated to reflect auto mileage in a rigorous manner, it is almost impossible to remember or to be able to estimate properly that point when certain specific maintenance needs to be performed. Consequently, either the service is neglected with the inherent increase in fuel consumption and potential damage to the automobile and its parts; or a service is performed before it is required, resulting in unnecessary cost to the automobile operator. With today's high labor costs, such over service can be almost, as costly as that created by neglect.

With the rapid growth of electronic technology in recent years, particularly with components which are, in effect, tiny computers, many problems previously difficult or too expensive to solve can now be addressed and economically redressed. The application of available electronic expertise to create planning allows us the ability to develop products which, from a cost standpoint alone, would have been impractical just a short time ago.

SUMMARY OF THE PRESENT INVENTION

The present invention generally comprises a device for indicating to a vehicle operator that a predetermined mileage interval has elapsed, and that scheduled maintainence is required. The device includes a clock generator which is driven by the vehicle engine ignition pulse. The clock output is fed to a frequency divider, producing a master clock signal which in turn drives four counters. Each counter includes AND logic connected to selected outputs thereof to be switched on after a pre-determined count (mileage interval) is attained by the counter. The AND logic of each counter drives a flip-flop which actuates an LED warning lamp. Each counter circuit includes a re-set button to reset the counter and its associated flip-flop when the indicated maintainence is performed. The LEDs may be labelled with a service function which should be performed after the time interval indicated by the respective LED.

A BRIEF DESCRIPTION OF THE DRAWING

The FIGURE is a block diagram of the the circuitry of the present invention.

DESCRIPTION OF THE PREFERRED EMBODIMENT

The present invention generally comprises a device which indicates to a vehicle operator that the vehicle has attained one of a plurality of elapsed mileage figures. With reference to the FIGURE, the present invention includes a clock generator 14 which is connected to and driven by the ignition pulse generator 11 of the vehicle's engine. The clock generator, which may comprise a 555 timer, produces a signal of approximately 24.3 hertz. This signal is fed to a frequency divider 16 which divides the clock signal by a factor of 2 to the 13th power. $[2^{13}]$. The output of the frequency divider 16, which comprises the master clock signal for the system, is fed directly to each of a plurality of counters 17, 18, 19, and 21. Each counter may comprise a CD4020 counter, as is known in the prior art. The master clock signal has a period of 24.3 divided by $2^{13}$, or approximately 1/337 seconds.

Each of the counters 17–19 and 21 is connected to a respective AND gate 22–24 and 26, respectively. Each of the AND gates is connected to selected outputs of its respective counter, so that the AND gate is actuated at a pre-determined count of the respective counter. For example, AND gate 22 is triggered after 60 hours, or approximately 2,500 miles of vehicle operation, while AND gate 23 is triggered after 120 hours of engine operation, or approximately 5,000 vehicle miles. AND gate 24 is triggered after 180 hours, or 7,500 miles of vehicle operation, and AND gate 26 is triggered after 300 hours, or 12,500 miles of operation.

The invention also includes a plurality of flip-flop circuits 27–29 and 31, each connected to a respective AND gate 22–24 and 26. Each of the flip-flops is connected to a respective one of a plurality of LEDs 32–34 and 36. The LEDs are mounted on a display panel on or near the vehicle dashboard, and are labelled with the service function they are to indicate is required at the elapsed mileage figure at which they are illuminated. For example, LED 32 may be labelled "CHANGE OIL", LED 33 may be labelled "TIRE ROTATION", LED 34 may be labelled "ENGINE TUNE-UP", and LED 36 may be labelled "LUBRICATION". These service functions are generally required at the mileage intervals at which the respective AND gates 22–24 and 26 are actuated by the counters.

It may be appreciated that the configurations of the AND gates with their respective counters may be individually altered to select the mileage interval at-which the corresponding LED will be illuminated.

Each counter circuit also includes one of a plurality of reset buttons 37–39 and 41, each of the reset buttons being connected to the respective counter and flip-flop of the circuit. Also, a master reset button 42 is connected to all of the reset lines of the individual counter circuits, so that the entire device may be cleared at once.

It should be noted that the LEDs will be illuminated by actuation of their respective flip-flop, and will remain illuminated until the respective reset button or the master reset button 42 is actuated.

It may be noted that the present invention employs the ignition pulse train of the vehicle engine as a signal indicating elapsed mileage of the vehicle itself. Although the present invention may be characterized as a device which monitors engine operating time rather than vehicle elapsed mileage, it has been shown that there is a strong correlation between the two factors. Furthermore, it is reasonable to assume that such maintenance procedures as oil change and engine tune-up should be performed more in accordance with a predetermined engine operating time interval, rather than the elapsed distance travelled by the vehicle. The correlation between operating time and mileage is provided primarily as a guide for the vehicle operator, due to the fact that most maintainence functions are scheduled according to mileage intervals rather than engine operating time intervals.

I claim:

1. In a vehicle having an engine operated by repetitive ignition pulses, a device for indicating required vehicle maintenance at predetermined elapsed time periods corresponding approximately to indicated mileage intervals, including clock generator means adapted to receive the vehicle engine ignition pulses and to generate output pulses in predetermined correspondence thereto, frequency divider means connected to said clock generator means for generating a master clock signal, a plurality of counters connected to said master clock signal, a plurality of logic gates, each connected to selected outputs of a respective one of said counters to produce an actuating signal at a predetermined count, and means connected to said logic gates for indicating that said predetermined count has been attained to thereby show said time for vehicle maintenance readable in approximate mileage.

2. The device of claim 1, wherein said last mentioned means includes a plurality of flip-flops, each receiving one of said actuating signals to be switched thereby.

3. The device of claim 2, further including a plurality of LEDs, each connected to one of said flip-flops to be illuminated when the respective flip-flop is switched.

4. The device of claim 2, further including reset means for individually resetting each of said counters and its respective flip-flop.

5. The device of claim 1, wherein said logic gates comprise AND gates.

6. The device of claim 4, further including reset means for resetting all of said counters and all of said flip-flops simultaneously.

* * * * *